UNITED STATES PATENT OFFICE.

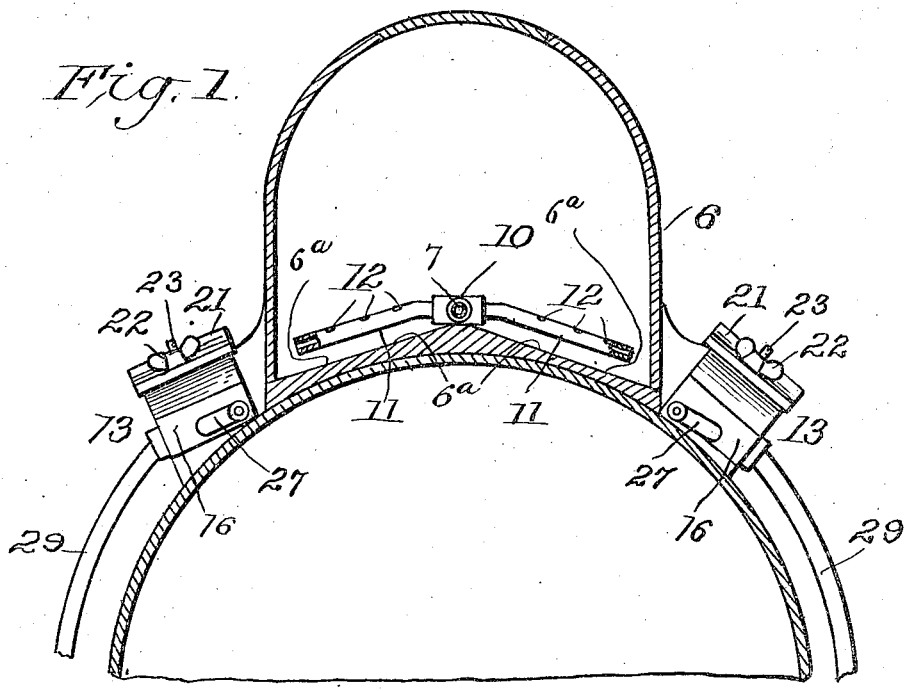

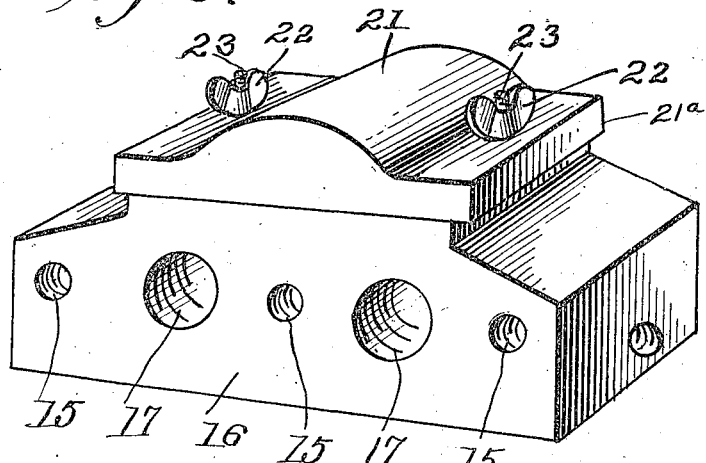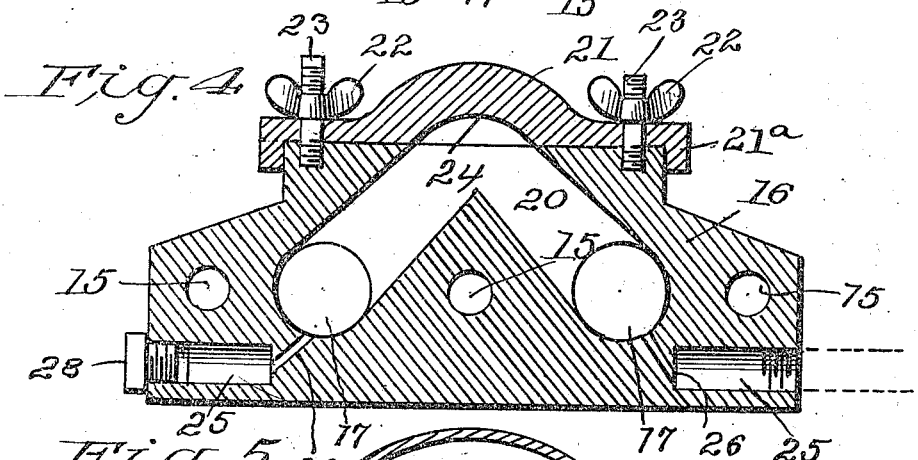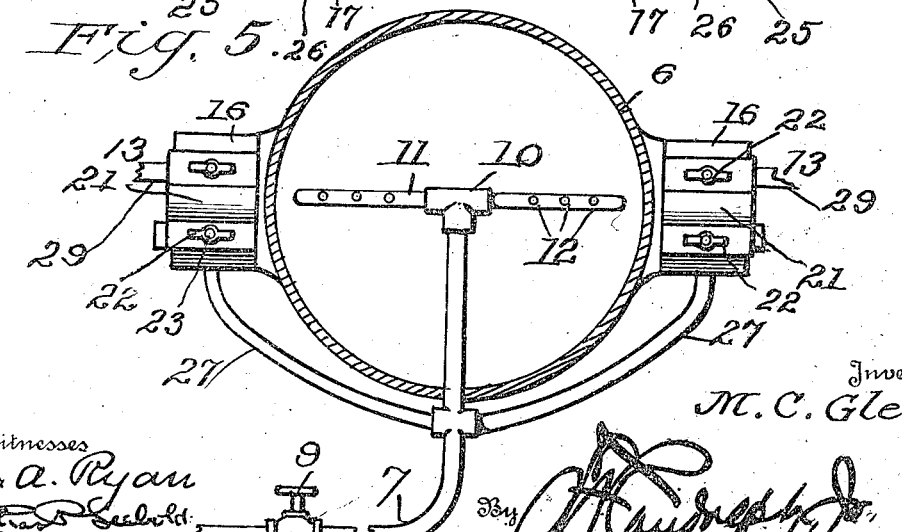

MILES C. GLENN, OF GREENSBORO, NORTH CAROLINA.

SANDING DEVICE FOR LOCOMOTIVES.

1,155,910.  Specification of Letters Patent.  Patented Oct. 5, 1915.

Application filed November 9, 1914. Serial No. 871,110.

*To all whom it may concern:*

Be it known that I, MILES C. GLENN, a citizen of the United States, residing at Greensboro, in the county of Guilford and State of North Carolina, have invented certain new and useful Improvements in Sanding Devices for Locomotives; and I do hereby declare the following to be a full, clear, and exact description of the invention, such as will enable others skilled in the art to which it appertains to make and use the same.

This invention has for its object to provide a sand trap of novel and efficient construction which may be attached to either the right or left hand side of the sand box of a railway locomotive.

Another object is the provision of a sand trap embodying a removable cover plate permitting quick access to the interior of the trap for removing obstructions therefrom.

Another object is the provision of a device located in the bottom of the sand box for agitating the sand within the latter to cause the same to flow into the sand traps.

With these and other objects in view, the invention consists in the novel construction, arrangement and formation of parts as will be hereinafter specifically described, claimed and illustrated in the accompanying drawing, in which:

Figure 1 represents a vertical sectional view through the sand box of a locomotive, showing the application thereto of the improved traps. Fig. 2 represents a side elevation, partly broken away of a locomotive equipped with the improved traps. Fig. 3 represents a perspective view of one of the traps removed. Fig. 4 represents a longitudinal sectional view through the trap. Fig. 5 represents a horizontal sectional view on the line 5—5 of Fig. 2.

Referring to the drawing in detail, wherein similar reference numerals designate corresponding parts throughout the several views, the numeral 6 indicates the sand box of a locomotive through which is extended an air pipe 7 suitably connected with the main air tank 8 of the air brake system and provided intermediate the box 6 and the tank 8 with a valve 9 preferably located in the locomotive cab, whereby the flow of fluid therethrough may be controlled. The bottom of the box 6 is raised centrally to provide the oppositely inclined surfaces 6ª. The forward extremity of the pipe 7 terminates centrally of the box 6 and is connected with a T 10 in which is fitted radially extending pipes 11 having open ends terminating in spaced relation to the side wall of the box and a plurality of perforations 12 therethrough whereby air is discharged into the box 6 to agitate the sand therein. The pipes 11 are arranged in close relation to the bottom of the box and parallel with the inclined surfaces 6ª.

The base portion of the box 6 is formed with lateral openings through which the sand enters the traps designated generally by the numerals 13 and suitably secured to the box 6 or base thereof by a plurality of bolts 14 positioned through apertures 15 formed transversely through the body 16 of the trap. Openings 17 are formed transversely through the body 16 in spaced relation and constitute sand passages communicating with the lateral openings in the sand box 6, and are formed at both ends with internal screw threads permitting the traps to be attached to either side of the sand box. The sand passages 17 are communicated by an inverted V shaped opening 20 extending upwardly through the top face of the body 16 and normally closed by a cover plate 21 having a depending flange 21ª secured to the body 16 by wing nuts and bolts 22 and 23 respectively. The inner or bottom face of the plate 21 is formed with a cavity 24 constituting a deflector, as will hereinafter appear.

The opposite ends of the body 16 are formed with air passages 25 communicating with the sand passages 17 through the reduced inclined ends 26. The passages 25 are internally screwthreaded to receive air pipe 27 connected with the main air pipe 7.

In use, the traps 16 may be arranged upon either side of the sand box 6, the forward air passages 25 being closed by suitable plugs 28 and the rear air passages are connected with the branch air pipes 27 of the main air pipe 7. Sand pipes 29 extending to the drive wheels of the locomotive are connected with the sand passages 17 of the traps 13. The device, as will be understood, may be operated by gravity or by compressed air. When the valve 9 in the air pipe is opened, the air flows through the pipes 7 and 11 and through the apertures 12 into the box 6 thus agitating and disintegrating the sand lying upon the inclined surface 6ª. The air discharged from the open ends of the pipes 12 thoroughly breaks up or disintegrates the sand lying between the ends of the pipes and the side wall of the sand box and blows the sand downwardly through the lateral openings in the box 6 into the traps 13. Air is also admitted to the pipes 27 and enters the passages 17 and is directed against the concavity 24 in the deflector plate 21.

What I claim is:

1. In combination, a sand box, and an air pipe arranged diametrically in the lower portion of said sand box having open ends and a plurality of apertures in the upper portion, and sand traps arranged on opposite sides of said sand box adjacent the open ends of said pipe.

2. In combination, a sand box, an air pipe having a plurality of apertures in the upper portion thereof and having open ends arranged in spaced relation to the wall of said box, and traps arranged on opposite sides of said sand box adjacent the open ends of said pipe.

3. In combination, a sand box having diametrically opposed openings in the lower portion thereof, an air pipe arranged in the lower portion of said box having a plurality of apertures in the upper portion thereof and having open ends disposed in spaced relation to the openings in said box, and traps arranged on opposite sides of said box and connected with said openings.

4. In combination, a sand box having a raised central portion providing oppositely inclined surfaces, an apertured air pipe arranged diametrically in said box, disposed parallel with said inclined surfaces and having open ends terminating in spaced relation to the wall of said box, and sand traps arranged on opposite sides of said sand box adjacent the open ends of said pipes.

5. In combination, a sand box having a raised central portion providing oppositely inclined surfaces, and an air pipe arranged diametrically in said box, disposed parallel with said inclined surfaces and adjacent thereto and having a plurality of apertures in the upper portion thereof.

6. In combination, a sand box having a raised central portion providing oppositely inclined surfaces, an apertured air pipe arranged diametrically in said box, disposed parallel with said inclined surfaces and having open ends terminating in spaced relation to the wall of said box.

7. A sand trap including a body having transverse sand passages therethrough and upwardly converged blast passages connecting said sand passages, said blast passages being disposed at approximately the same angle with relation to the horizontal, said body having inclined air passages communicating centrally with said sand passages, and a cover plate arranged over said body having a concavity registering with the upper end of the converged blast passages.

In testimony whereof I affix my signature in presence of two witnesses.

MILES C. GLENN.

Witnesses:
M. ROBINS,
CHAS. A. HINES.